United States Patent
Gustof et al.

(10) Patent No.: US 12,293,000 B2
(45) Date of Patent: May 6, 2025

(54) DEVICE AND METHOD FOR REDACTING RECORDS BASED ON A CONTEXTUAL CORRELATION WITH A PREVIOUSLY REDACTED RECORD

(71) Applicant: MOTOROLA SOLUTIONS, INC., Chicago, IL (US)

(72) Inventors: Grzegorz Gustof, Myslenice (PL); Stefan Koprowski, Myslenice (PL); Chris A Kruegel, Plainfield, IL (US); Stuart J Boutell, Edinburgh (GB)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 497 days.

(21) Appl. No.: 17/645,494

(22) Filed: Dec. 22, 2021

(65) Prior Publication Data
US 2023/0195934 A1    Jun. 22, 2023

(51) Int. Cl.
*G06F 21/62*    (2013.01)
*G06V 20/40*    (2022.01)
*G06V 40/10*    (2022.01)

(52) U.S. Cl.
CPC .......... *G06F 21/6254* (2013.01); *G06V 20/41* (2022.01); *G06V 40/103* (2022.01)

(58) Field of Classification Search
CPC ... G06F 21/6254; G06V 20/41; G06V 40/103
See application file for complete search history.

(56) References Cited

U.S. PATENT DOCUMENTS

| | | | |
|---|---|---|---|
| 7,805,673 B2 | 9/2010 | Quaeler et al. | |
| 10,083,320 B2 | 9/2018 | Panchapakesan et al. | |
| 10,158,639 B1 * | 12/2018 | Goben | H04L 63/10 |
| 10,242,282 B2 | 3/2019 | Loce et al. | |
| 11,122,237 B2 | 9/2021 | Nguyen et al. | |

(Continued)

OTHER PUBLICATIONS

Secure Redact—Video redaction software, https://www.secureredact.co.uk/, downloaded from the internet: Dec. 8, 2021, all pages.

(Continued)

*Primary Examiner* — Emmanuel L Moise
*Assistant Examiner* — Xiang Yu
(74) *Attorney, Agent, or Firm* — Raguraman Kumaresan

(57) ABSTRACT

A process of redacting records based on a contextual correlation with a previously redacted record. In operation, an electronic computing device obtains redaction metadata associated with a previously redacted record and uses the redaction metadata to identify a segment within an unredacted record that was redacted to generate the previously redacted record. The device then processes the segment to detect characteristics of a person or the object captured in the unredacted record and further redacted in the redacted record. The device also determines a context in which the redacted person or object was captured within the segment of the unredacted record. The device then redacts a person or object captured in other unredacted records when such person or object is contextually related to the redacted person or object captured in the unredacted record corresponding to the previously redacted record.

20 Claims, 9 Drawing Sheets

(56) References Cited

U.S. PATENT DOCUMENTS

| | | | | |
|---|---|---|---|---|
| 2012/0233535 A1* | 9/2012 | Piersol | ............... | G06F 40/197 |
| | | | | 715/234 |
| 2012/0304304 A1* | 11/2012 | Avrahami | ............... | H04L 67/10 |
| | | | | 726/27 |
| 2018/0285591 A1* | 10/2018 | Thayer | ............... | G06F 21/6254 |
| 2020/0110902 A1* | 4/2020 | Zakour | ............... | G06F 16/22 |
| 2020/0174990 A1* | 6/2020 | Pratkanis | ............... | H04L 9/0637 |
| 2020/0293791 A1* | 9/2020 | Womack | ............... | G06V 20/52 |
| 2022/0043935 A1* | 2/2022 | Brannon | ............... | G06F 16/335 |

OTHER PUBLICATIONS

CaseGuard—Redation for Law Enforcement, https://caseguard.com/use-cases/law-enforcement/ , downloaded from the internet: Dec. 8, 2021, all pages.
The International Search Report and the Written Opinion, corresponding patent application No. PCT/US2022/052107 filed: Dec. 7, 2022, mailed: May 19, 2023, all pages.

* cited by examiner 150-3

INCIDENT REPORT

| DETAILS | INTERVIEWS | MEDIA |

900

> TIME: 16: 38 SEPTEMBER 17 2021 (WITHIN 5 MINUTES)

> INCIDENT TYPE: VEHICLE ACCIDENT

> LOCATION: 234 SOME ADDRESS, SOME TOWN (WITHIN 100 M)

INCIDENT DETAILS

LOREM IPSUM DOLOR SIT OMET, CONSECTETUR ODIPISCING ELIT. SED CONDIMENTUM PLACERAT LIBERO, VEL RHONCUS AUGUE PORTA AT. SED EGET ULLAMCORPER NIBH. VESTIBULUM ANTE IPSUM PRIMIS IN FAUCIBUS ORCI LUCTUS ET TRICES POSUERE CUBILIA CURAE, PHASELLUS TEMPOR RUTRUM URNA. NULLA EGET SODALES SEM. INTEGER NEC ▮▮▮▮ LOREM IPSUM DOLOR SIT AMET, CONSECTETUR ADIPISCING ELIT. CURABITUR IMPERDIET, ODIO EGET CURSUS VESTIBULUM, LEO ENIM IACULIS NUNC,

DEVICE AND METHOD FOR REDACTING RECORDS BASED ON A CONTEXTUAL CORRELATION WITH A PREVIOUSLY REDACTED RECORD

BACKGROUND

Organizations such as public safety agencies and private enterprises store large amounts of data records including videos, photos, audios, and text records. It may be necessary to redact sensitive data (e.g., privileged, confidential, or private data) contained in the data records to prevent the inadvertent disclosure of sensitive data to unintended users. Redaction may include obscuring, removing, or blocking out certain portions of the original data records. While a user can manually perform redaction on the data records, such manual redaction may be time consuming and further prone to redactions errors including inconsistent redaction of data records that may be contextually related to each other.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

FIG. 9 shows an example of a redacted record generated based on redaction applied to the incident report included in the unredacted record shown in FIG. 8 in accordance with some embodiments.

Figure 1:
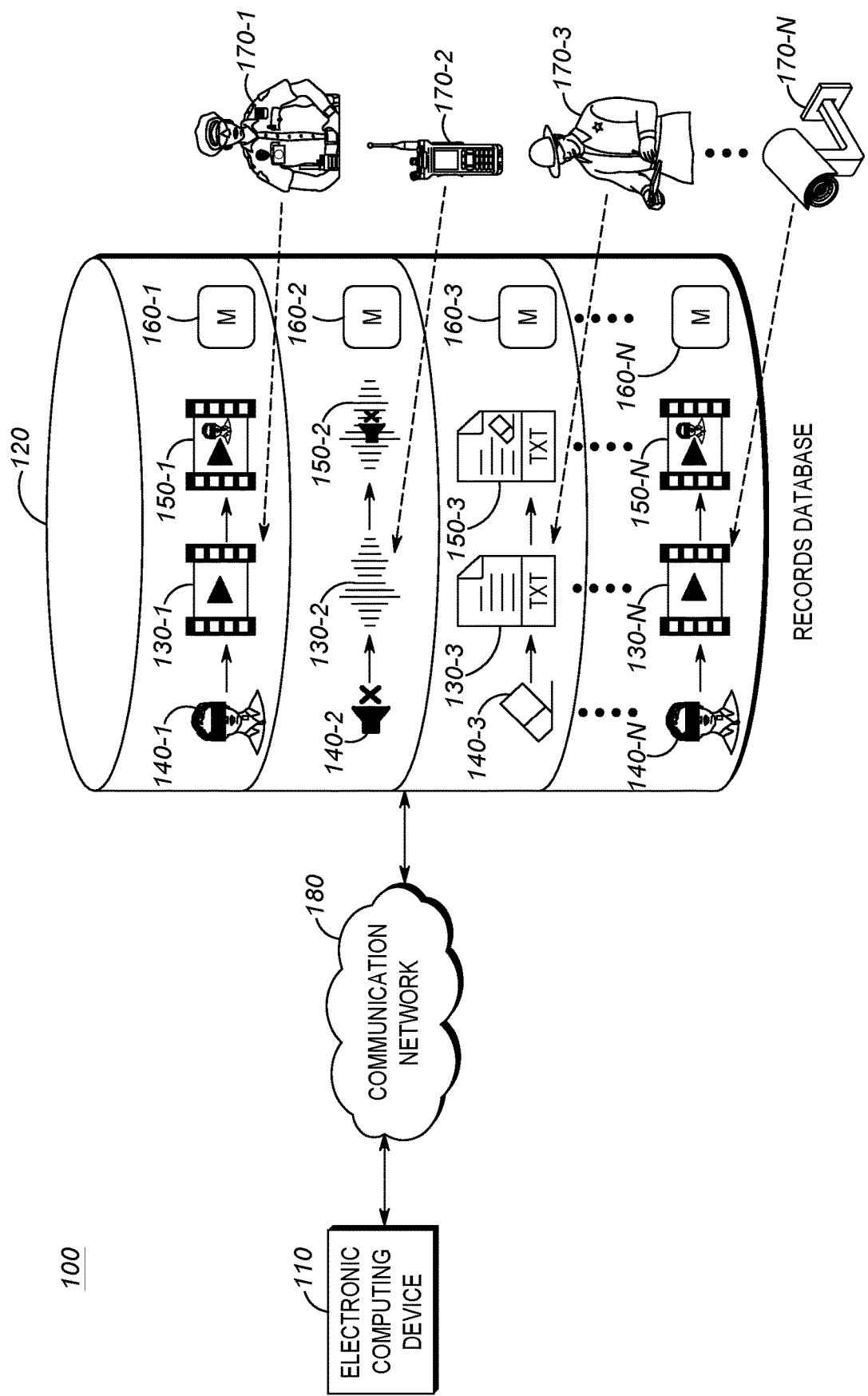
FIG. 1 is a block diagram of a system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

As described above, redaction may be performed to obscure or remove sensitive data contained in data records. Data records maintained by one or more organizations may be contextually related to each other, for example, when the data records are captured in relation to a same event, incident, or situation. In these cases, when any sensitive data is redacted from one record, it is necessary to identify and redact other contextually-related data records containing same or similar data. As an example, assume that a public-safety incident is captured via different recording sources (e.g., a body-worn camera, a surveillance camera, or an audio recorder). In this example, data records obtained from different recording sources may contain similar data. For instance, it is possible that a person witnessing a public-safety incident may be captured in data records obtained through multiple data recording sources. In order to protect the identity of the person who witnessed the incident, a public-safety agency may decide to redact characteristics (e.g., face) of the person in an image or a video, for example, captured by a body-worn camera of a responding officer. For example, when the face of the person captured in one data record is redacted, it is also necessary for the agency to identify other data records (e.g., data records captured by other recording sources) that may be contextually-related (e.g., when records are linked to the same incident) to a previously redacted record and further redact the face of the person as well as other visually and non-visually identifiable information (e.g., person's voice, name, address, phone number, social security number etc.) related to the person irrespective of the format (i.e., image, video, audio, or text) in which the data was recorded. While humans could attempt to manually process each data record to identify portions of the data record that contain the person's identifiable information, it would not be scalable for humans to process hundreds and thousands of data records (that may be maintained corresponding to a single incident) to first identify data records that are contextually related to each other and to further consistently redact the person's identifiable information that may or may not be recorded in the same data format as other records. Manual redaction is also prone to errors when the person's identifiable information is not identified and consistently redacted across all contextually-related data records. As an example, when a person's face is redacted from an image or a video obtained in relation to a particular incident, it is also important to redact portions of an audio containing the person's speech to ensure that the person's identity cannot be deduced from the speech content or voice pattern. Moreover, a user redacting sensitive data on data records obtained from recording sources associated with one agency may not be aware that the same sensitive data was recorded by recording sources associated with a different agency (or a different group within the same agency). The inconsistent redaction or non-redaction of data across data records maintained by multiple agencies may lead to inadvertent disclosure of sensitive data (e.g., person's personal identifiable information) to unintended persons. Accordingly, there is a need for an improved device and process for automatically redacting records of different data types based on a contextual correlation with one or more previously redacted records.

One embodiment provides a method of redacting records based on a contextual correlation with a previously redacted record. The method comprises: obtaining, at an electronic computing device, redaction metadata associated with a redacted record, the redaction metadata identifying a segment within an unredacted record to which redaction was applied to generate the redacted record; processing, at the electronic computing device, the identified segment of the unredacted record to detect that a person or an object captured within the identified segment of the unredacted record was redacted in the redacted record; processing, at the electronic computing device, the identified segment of the unredacted record to detect characteristics of the person or the object; obtaining, at the electronic computing device, at least one context attribute specifying a context in which the redacted person or the redacted object was captured within the identified segment of the unredacted record: identifying, at the electronic computing device, at least one other unredacted record that is associated with the unredacted record; determining, at the electronic computing device, that characteristics of a person or an object captured within at least one other segment of the at least one other unredacted record match with the characteristics of the person or the object captured within the identified segment of the unredacted record; obtaining, at the electronic computing device, at least one other context attribute specifying a context in which the person or the object was captured within the at least one other segment of the at least one other unredacted record; determining, at the electronic computing device, a contextual correlation value based on a correlation between the at least one context attribute and the at least one other context attribute; and when the contextual correlation value exceeds a correlation threshold, generating at least one other redacted record by redacting the person or the object captured within the at least one other segment of the at least one other unredacted record.

Another embodiment provides an electronic computing device. The electronic computing device includes a communications interface and an electronic processor communicatively coupled to the communications interface. The electronic processor is configured to: obtain redaction metadata associated with a redacted record, the redaction metadata identifying a segment within an unredacted record to which redaction was applied to generate the redacted record; process the identified segment of the unredacted record to detect that a person or an object captured within the identified segment of the unredacted record was redacted in the redacted record; process the identified segment of the unredacted record to detect characteristics of the person or the object; obtain at least one context attribute specifying a context in which the redacted person or the redacted object was captured within the identified segment of the unredacted record: identify at least one other unredacted record that is associated with the unredacted record; determine that characteristics of a person or an object captured within at least one other segment of the at least one other unredacted record match with the characteristics of the person or the object captured within the identified segment of the unredacted record; obtain at least one other context attribute specifying a context in which the person or the object was captured within the at least one other segment of the at least one other unredacted record; determine a contextual correlation value based on a correlation between the at least one context attribute and the at least one other context attribute; and generate at least one other redacted record by redacting the person or the object captured within the at least one other segment of the at least one other unredacted record when the contextual correlation value exceeds a correlation threshold.

Each of the above-mentioned embodiments will be discussed in more detail below, starting with example system and device architectures of the system in which the embodiments may be practiced, followed by an illustration of processing blocks for achieving an improved technical method, device, and system for redacting records based on a contextual correlation with a previously redacted record. Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Referring now to the drawings, and in particular FIG. 1, a system 100 is shown including an electronic computing device 110 configured to provide a redaction service corresponding to data records maintained by one or more agencies in one or more records databases 120. An agency is an organizational entity that may store, retrieve, and/or process various types of data records stored in the records database 120 related to the organization's goals, activities, resources, and the like. In some embodiments, an agency may represent a private enterprise organization such as press, media, utilities, retail, healthcare, manufacturing, oil/gas, electric, private security, or other business. In other embodiments, an agency may represent a public organization such as a public-safety agency (e.g., police, fire, emergency medical service), governmental entity (e.g., court, city administration), and the like. The one or more records databases 120 may be implemented using any type of storage device, storage server, storage area network, redundant array of independent discs, cloud storage device, or any type of local or network-accessible data storage device configured to store data records for access by computing devices. In some embodiments, the one or more records databases 120 are commercial cloud-based storage devices. In some embodiments, the one or more records databases 120 are housed on suitable on-premise database servers or edge computing devices that may be owned and/or operated by one or more of public-safety or private agencies. The one or more records databases 120 may be maintained by third parties as well. The data records may be stored at the one or more records databases 120 in any suitable format or data type, for example, video, image, audio, text, or combination thereof. The records database 120 can include additional or fewer records and/or different types of records than illustrated in the example of FIG. 1. In accordance with some embodiments, the electronic computing device 110 obtains permission to access and process all or subset of data records maintained in one or more records databases 120 and owned by one or more agencies prior to providing a redaction service to the one or more agencies.

In accordance with embodiments, the records database 120 stores unredacted records 130 (e.g., unredacted records 130-1, 130-2, 130-3 . . . 130-N), redacted records 150 (e.g., redacted records 150-1, 150-2, 150-3 . . . 150-N), and redaction metadata 160 (e.g., redaction metadata 160-1, 160-2, 160-3 . . . 160-N). Although the unredacted records 130, redacted records 150, and redaction metadata 160 are illustrated as stored in a single records database 120 in FIG. 1, the unredacted records 130, redacted records 150, and redaction metadata 160 may be stored in separate databases. The unredacted records 130 stored in the records database 120 include original data (i.e., in unredacted form) recorded by recording sources 170 (e.g., recording sources 170-1, 170-2, 170-3 . . . 170-N). In some embodiments, the unredacted records 130 may represent images, videos, audios, or text captured in relation to a particular incident. As used herein, the term "incident" may refer to an event, occurrence, or situation that an agency has been tasked to resolve (e.g., a traffic accident, public disturbance, medical emergency, fire, broken water meter or power line, etc.). The unredacted records 130 stored at the records database 120 include records that are of different record types. In the example shown in FIG. 1, the unredacted record 130-1 represents an image or a video recorded by a recording source 170-1 (e.g., a body-worn camera), the unredacted record 130-2 represents an audio (e.g., talk group conversations) recorded through a recording source 170-2 (e.g., a land mobile radio), and the unredacted record 130-3 represents text data (e.g., an incident report) submitted through a recording source 170-3 (e.g., a communication device operated by a public-safety officer). Similarly, the unredacted record 130-N represents an image or a video recorded by a recording source 170-N (e.g., a surveillance camera). Although the unredacted records 130 are shown in FIG. 1 as recorded by different recording sources 170, embodiments described herein can be implemented in a similar manner to redact groups of unredacted records 130 that may be captured by the same recording source 170. In accordance with some embodiments, the unredacted records 130 illustrated in FIG. 1 may be associated with a single agency or multiple agencies. For example, the recording sources 170-1, 170-2, and 170-3 may be associated with a first agency (e.g., police department) and the recording source 170-N may be associated with a second agency (e.g., city administration). In this case, the recording sources 170-1, 170-2, and 170-3 may be configured by the first agency to record and upload the respective unredacted records 130-1, 130-2, and 130-3 to the records database 120 that may be accessible by users affiliated with the first agency. Similarly, the recording source 170-N may be configured by the second agency to record and upload the unredacted record 130-N to a different records database 120 that may be accessible by users affiliated with the second agency. In one embodiment, the electronic computing device 110 may obtain permission to access data records respectively associated with the first and second agencies and to provide redaction services corresponding to the data records associated with the first and second agencies. In accordance with some embodiments, the unredacted records 130-1, 130-2, 130-3 . . . 130-N are stored in separate databases each operated by a different private or public agency.

The redacted records 150 are generated based on applying redaction 140 (e.g., redaction 140-1, 140-2, 140-3 . . . 140-N) to the corresponding unredacted records 130. In accordance with some embodiments, the redaction 140 may be applied (e.g., by the electronic computing device 110) automatically or in response to a user input indicating a selection of a particular object (e.g., vehicle license plate, person's face) or a particular segment (e.g., frame number, time frame, pixel coordinates, specific image or an area within an image, line number or a region within the text, etc.) and a corresponding type of redaction (e.g., blurring, removing etc.) to be applied to the particular object or segment. As an example, redaction 140-1 is applied to the unredacted record 130-1 to generate a redacted record 150-1 in which, for instance, a segment of an image showing a person's face is redacted (e.g., blurred). In one embodiment, the redaction 140-1 may involve application of a redaction filter (e.g., blur filter) to pixel values within an area of pixels (e.g., an area containing a selected object) associated with an image to be redacted. The application of a redaction filter may modify optical characteristics (e.g., reduction of optical intensity) of one or more pixel values to which the filter is applied. The modification of the optical characteristics of the pixel values may make the area (e.g., an area showing the person's face) within a particular image more coherent and less distinct, resulting in a redacted image. Alternatively, the redaction 140-1 may also involve removing certain pixel values within an image or certain frames within an image containing data (e.g., face of a person) that is to be redacted.

In accordance with some embodiments, a redaction metadata 160 is generated each time a redacted record 150 is generated from an unredacted record 130. The redaction metadata 160 associated with a redacted record 150 identifies one or more segments (e.g., frame number, pixel coordinates, etc.) within an unredacted record 130 to which redaction 140 was applied to generate the redacted record 150. As an example, a redaction metadata 160-1 identifies a particular segment within the unredacted record 130-1 to which the redaction 140-1 was applied to generate the redacted record 150-1. In this example, the particular segment may refer to pixel coordinates identifying a region (e.g., a region within an image) where an unredacted face of a person appears within the unredacted record 130-1.

Depending on the type of redaction 140-1 applied to the unredacted record 130-1, the corresponding region (i.e., region containing the face of a person) is blurred, removed, or masked to generate the corresponding redacted record 150-1.

In accordance with some embodiments, the electronic computing device 110 is configured to automatically redact other unredacted records 130 (e.g., unredacted records 130-2, 130-3 . . . 130-N) based on a contextual correlation with a previously redacted record 150 (e.g., a redacted record 150-1 previously generated from redacting an unredacted record 130-1). In these embodiments, the electronic computing device 110 uses the redaction metadata 160 of a previously redacted record 150 to determine a context in which a person or object was redacted from an unredacted record 130 corresponding to the previously redacted record 150. The electronic computing device 110 further redacts other unredacted records 130 when the same redacted person or object is captured within other unredacted records under a same or similar context. As an example, the electronic computing device 110 uses the redaction metadata 160-1 associated with a previously redacted record 150-1 to identify a segment (e.g., frame number of a video) within the unredacted record 130-1 to which redaction 140-1 was applied to generate the redacted record 150-1. The electronic computing device 110 then processes the identified segment within the unredacted record 130-1 to detect a context in which a person or object captured within the identified segment of the unredacted record 130-1 was redacted in the redacted record 150-1. The electronic computing device 110 then redacts other unredacted records 130-2, 130-3, . . . 130-N when information related to the same person or object is visually or non-visually captured within the unredacted records 130-2, 130-3, . . . 130-N under a same or similar context.

In the example shown in FIG. 1, the electronic computing device 110 may apply redaction 140-2 to the unredacted record 130-2 to generate a redacted record 150-2 in which, for instance, a segment of audio data containing a speech of the person (i.e., a person whose face was redacted in the previously redacted record 150-1) is redacted. The redaction 140-2 may involve muting or removing portions of the audio data in which the person's speech (or other identifiable information about the person such as name, address, phone, vehicle license plate number etc., are detected. The redaction 140-2 may also involve changing a person's voice (e.g., by adding distortions, changing tone or pitch, etc.) to protect the identity of the person. The electronic computing device 110 also generates a redaction record 150-2 identifying one or more audio segments within the corresponding unredacted record 130-2 to which the redaction 140-2 was applied to generate the redaction record 150-2. As further shown in FIG. 1, the electronic computing device 110 may apply redaction 140-3 to unredacted record 130-3 to generate a redacted record 150-3 in which, for instance, a portion of incident report containing a person's personal identifiable information (e.g., name, address, phone number, personal characteristics, vehicle license plate number, etc.) is redacted. The redaction 140-3 may involve obscuring or removing portions of the incident report in which the person's personal identifiable information appears. The electronic computing device 110 also generates a redaction record 160-3 identifying one or more segments within the corresponding unredacted record 130-3 to which the redaction 140-3 was applied to generate the redaction record 150-3.

In accordance with embodiments, the electronic computing device 110 is implemented as a standalone electronic device or alternatively integrated into one or more computing devices (e.g., computing devices operated by one or more agencies) operating within the system 100. The electronic computing device 110 and the recording sources 170 communicate with the records database 120 via one or more communication networks 180. The communication network 180 includes wireless and wired connections. For example, the communication network 180 may be implemented using a wide area network, such as the Internet, a local area network, such as a Wi-Fi network, and personal area or near-field networks, for example a Bluetooth™ network. Portions of the communications network 180 may include a Long Term Evolution (LTE) network, a Global System for Mobile Communications (or Groupe Special Mobile (GSM)) network, a Code Division Multiple Access (CDMA) network, an Evolution-Data Optimized (EV-DO) network, an Enhanced Data Rates for GSM Evolution (EDGE) network, a 3G network, a 4G network, a 5G network, and combinations or derivatives thereof.

Figure 2:
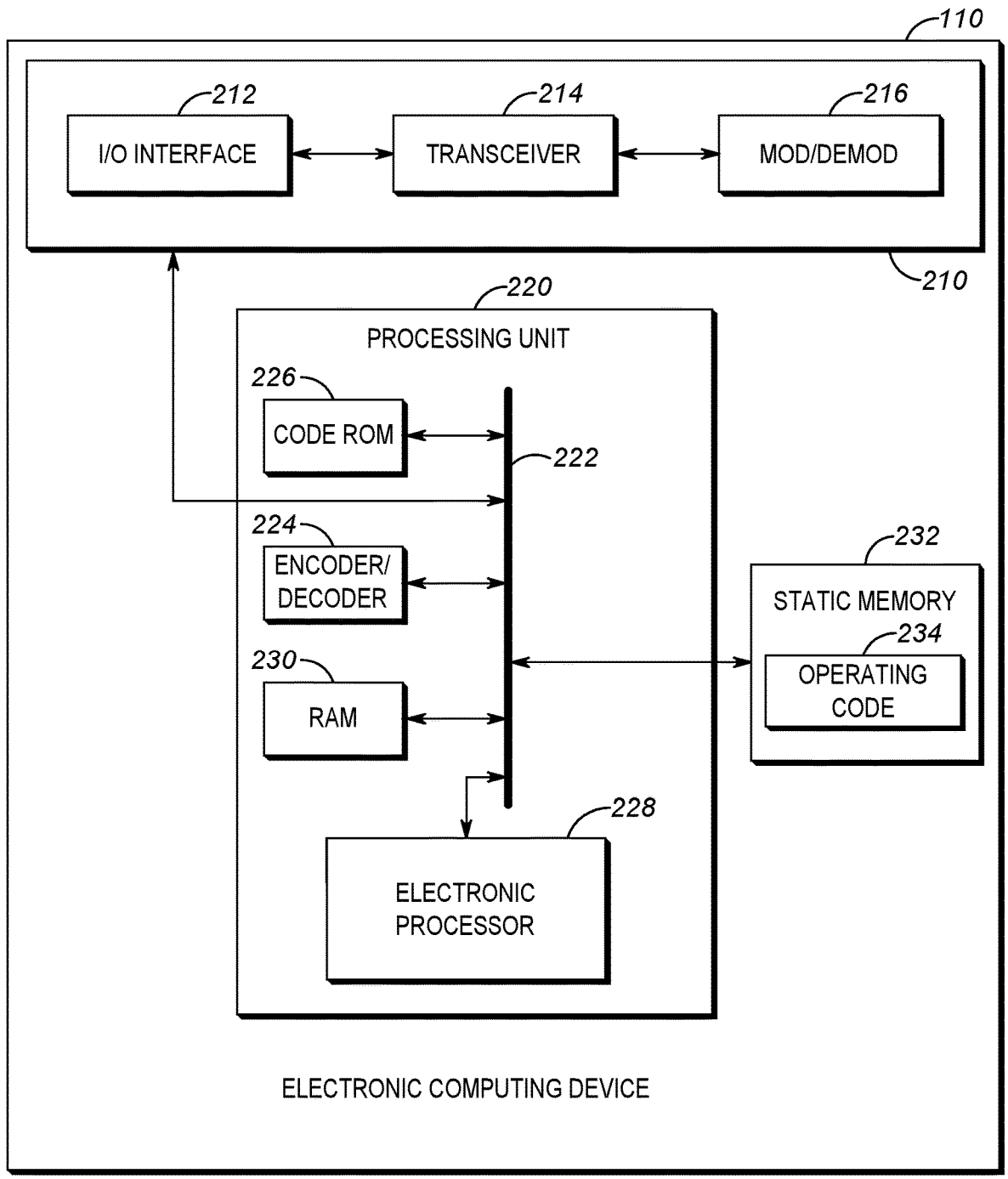
FIG. 2 is a block diagram of an electronic computing device shown in FIG. 1 in accordance with some embodiments.

FIG. 2 is an example functional block diagram of an electronic computing device 110 operating within the system 100 in accordance with some embodiments. The electronic computing device 110 may be embodied in computing devices not illustrated in FIG. 1, and/or may be a distributed computing device across two or more of the foregoing (or multiple of a same type of one of the foregoing) and linked via a wired and/or wireless communication link(s). In one embodiment, one or more functions of the electronic computing device 110 may be executed at one or more other computing devices (e.g., recording sources 170, servers hosting the one or more records databases 120, etc.) operating within the system 100. While FIG. 2 represents an electronic computing device 110 described above with respect to FIG. 1, depending on the type of the computing device, the electronic computing device 110 may include fewer or additional components in configurations different from that illustrated in FIG. 2.

As shown in FIG. 2, the electronic computing device 110 includes a communications interface 210 coupled to a common data and address bus 222 of a processing unit 220. The communications interface 210 sends and receives data to and from other devices (e.g., records database 120) in the system 100. The communications interface 210 may include one or more wired and/or wireless input/output (I/O) interfaces 212 that are configurable to communicate with other devices in the system 100. For example, the communications interface 210 may include one or more wireless transceivers 214, such as a digital mobile radio (DMR) transceiver, a project 25 (P25) transceiver, a Bluetooth transceiver, a Wi-Fi transceiver perhaps operating in accordance with an IEEE 802.11 standard (for example, 802.11a, 802.11b, 802.11g), an long term evolution (LTE) transceiver, a WiMAX transceiver perhaps operating in accordance with an IEEE 802.16 standard, and/or another similar type of wireless transceiver configurable to communicate via a wireless radio network. The communications interface 210 may additionally or alternatively include one or more wireline transceivers 214, such as an Ethernet transceiver, a universal serial bus (USB) transceiver, or similar transceiver configurable to communicate via a twisted pair wire, a coaxial cable, a fiber-optic link, or a similar physical connection to a wireline network. The transceiver 214 is also coupled to a combined modulator/demodulator 216.

The processing unit 220 may include an encoder/decoder 224 with a code Read Only Memory (ROM) 226 coupled to the common data and address bus 222 for storing data for initializing system components. The processing unit 220 may further include an electronic processor 228 (for example, a microprocessor, a logic circuit, an application-specific integrated circuit, a field-programmable gate array, or another electronic device) coupled, by the common data and address bus 222, to a Random Access Memory (RAM) 230 and a static memory 232. The electronic processor 228 may generate electrical signals and may communicate electrical signals through the communications interface 210, such as for receipt by the records database 120.

Figure 3:
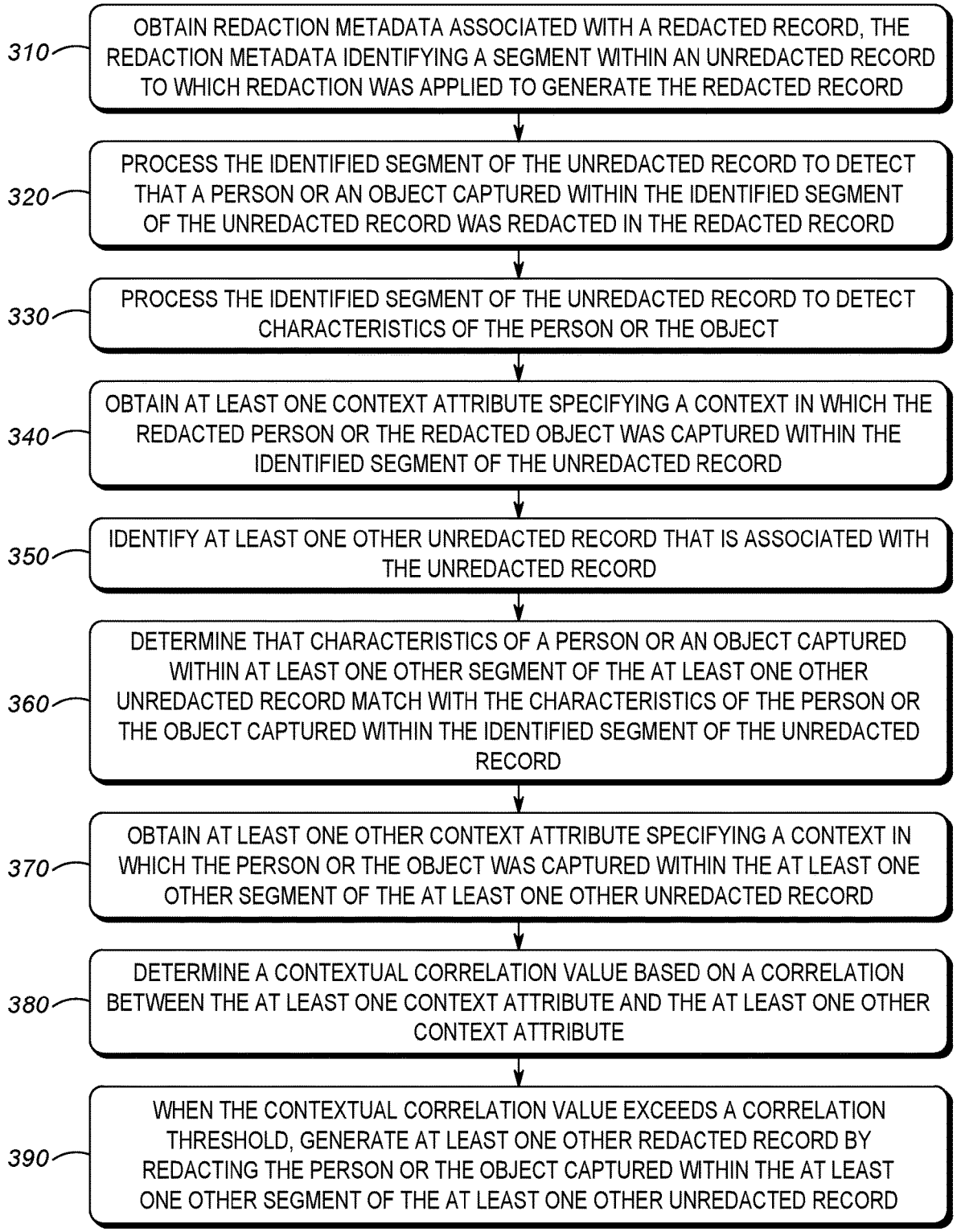
FIG. 3 illustrates a flowchart of a process for redacting records based on a contextual correlation with a previously redacted record in accordance with some embodiments.

Static memory 232 may store operating code 234 for the electronic processor 228 that, when executed, performs one or more of the blocks set forth in FIG. 3 and the accompanying text(s). The static memory 232 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, and the like. In accordance with embodiments, the static memory 232 may further store information required for the electronic computing device 110 to provide redaction services corresponding to data records maintained by one or more agencies in one or more records databases 120. For example, the electronic computing device 110 may download one or more data records from the one or more records databases 120 and further temporarily store the data records at the static memory 232 during execution of the process 300 set forth in FIG. 3. In accordance with embodiments, the electronic computing device 110 employs one or more analytics engines (e.g., a video analytics engine, audio analytics engine, natural language processing engine etc.) to process data records and to detect identifiable information related to persons or objects that may need to be redacted from unredacted records 130 based on redaction 140 applied to a previously redacted record 150. In one embodiment, the executable code corresponding to the one or more analytics engines may be stored at the static memory 232. In another embodiment, the analytics engines may reside in a computing device other than the electronic computing device 110. In this case, the electronic computing device 110 may request a computing device hosting the analytics engines to analyze the data records and provide analytics data corresponding to persons or objects captured within the data records to the electronic computing device 110.

Turning now to FIG. 3, a flowchart diagram illustrates a process 300 for redacting records based on a contextual relation with a previously redacted record. While a particular order of processing steps, message receptions, and/or message transmissions is indicated in FIG. 3 as an example, timing and ordering of such steps, receptions, and transmissions may vary where appropriate without negating the purpose and advantages of the examples set forth in detail throughout the remainder of this disclosure. An electronic computing device 110 shown in FIG. 1 and/or FIG. 2, and embodied as a singular computing device or distributed computing device may execute process 300 via an electronic processor 228. In accordance with some embodiments, the process 300 is executed by an electronic computing device 110 employed by or associated with one or more agencies requesting a redaction service corresponding to data records maintained by the agencies in one or more records databases 120.

The electronic computing device 110 may execute the process 300 at power-on, at some predetermined periodic time period thereafter, in response to a trigger raised locally at the computing device 110 via an internal process or via an input interface or in response to a trigger from an external device to which the electronic computing device 110 is communicably coupled, among other possibilities. As an example, the electronic computing device 110 is programmed to execute the process 300 when a request to provide a redaction service is received from a user affiliated with an agency.

The process 300 of FIG. 3 need not be performed in the exact sequence as shown and likewise various blocks may be performed in different order or alternatively in parallel rather than in sequence. The process 300 may be implemented on variations of the system 100 of FIG. 1 as well.

At block 310, the electronic computing device begins to execute the process 300 by obtaining redaction metadata (e.g., redaction metadata 160-1) associated with a redacted record (e.g., a redacted record 150-1). In one embodiment, the electronic computing device 110 is programmed to begin execution of the process 300 each time a redacted record 150 (e.g., redacted record 150-1, also referred to as "a previously redacted record") is generated based on applying redaction (e.g., redaction 140-1) to the unredacted record 130 (e.g., unredacted record 130-1). In one embodiment, the electronic computing device 110 is programmed to begin execution of the process 300 in response to detecting that a redacted record has been generated based on applying a manual redaction 140 to an unredacted record 130. In other words, in this embodiment, the electronic computing device 110 begins to execute the process 300 whenever a redacted record is generated based on user inputs indicating which particular one or more segments of an unredacted record 130 should be redacted or which particular one or more of persons or objects (visually, audibly, or textually captured within the unredacted record 130) should be redacted. In accordance with some embodiments, the electronic computing device 110 may be programmed to automatically obtain redaction metadata 160 associated with a redacted record 150 whenever an unredacted record 130 stored at the records database 120 has been redacted to generate the redacted record 150.

In one embodiment, the redaction metadata 160 identifies a segment (or in some cases, multiple segments) within an unredacted record 130 to which redaction 140 was applied to generate the previously redacted record 150. The term "segment" may indicate one or more of: a particular frame number or time frame within a video or audio; pixel coordinates or a particular area or a boundary within an image; a line number, a paragraph number, or a particular area within a text document; or any other data identifying which portions of the data record have been redacted. In one embodiment, the redaction metadata 160 may optionally include information indicating a rule, policy, or a reason under which an identified segment (or a person or object) within the unredacted record 130 has been redacted to generate the redaction record. As an example, an agency may have a policy of redacting, from certain unredacted records 130, personal identifiable information related to persons (e.g., bystanders) when such information does not have any evidentiary value with respect to a public-safety incident. As another example, an agency may have a policy of redacting, from certain unredacted records 130, personal identifiable information related to persons participating in a witness protection program. As a further example, an agency may have a policy of redacting, from certain unredacted records 130, personal identifiable information related to officers who have been authorized to participate in an under-cover or covert public-safety operation. In these examples, the redaction metadata 160 may include information identifying a particular redaction policy or rule as well as information indicating (but not including any personal identifiable information) that a person (or any object associated with the person) has been redacted from the unredacted record 130 in accordance with the agency's policy. The redaction metadata 160 may also include information indicating non-personal identifiable information, for example, number of persons or objects or characteristics of such persons or objects that have been redacted within one or more of the identified segments of the previously redacted record 150.

At block 320, the electronic computing device 110 processes the identified segment (or in some cases multiple identified segments) of the unredacted record 130 using one or more analytics engines to detect that a person or an object captured within the identified segment of the unredacted record 130 was redacted in the redacted record 150. The analytics engines employed by the electronic computing device 110 may include one or more of person, object, or text classifiers, where each classifier may be particularly trained to detect an instance of a person or an object captured (e.g., visually, audibly, or textually captured) within the identified segment of the unredacted record 130. As an example, when the unredacted record 130 is an image record, the electronic computing device 110 may process the identified segment (e.g., pixel coordinates identified in the redaction metadata 160) using an image analytics engine to detect that a person (e.g., person's face) or an object (e.g., vehicles license plate) captured within the identified segment of the unredacted record 130 (e.g., unredacted record 130-1) was redacted in the previously redacted record 150 (e.g., redacted record 150-1). As another example, when the unredacted record 130 is a text-based incident report, the electronic computing device 110 may process the identified segment (e.g., a line number, a page number, a document number, a file name, etc.) using an analytics engine (e.g., natural language processing engine) to detect that information (e.g., captured in textual form) related to a person (e.g., a person's personal identifiable information such as name, address, phone number, social security number, etc.) or an object (e.g., license plate number in a vehicle) captured within the identified segment of the unredacted record 130 was redacted in the previously redacted record 150.

At block 330, the electronic computing device 110 further processes the identified segment (or in some cases, multiple identified segments) of the unredacted record 130 using one or more analytics engines to detect specific characteristics of the person or the object captured within the identified segment of the unredacted record 130 and further redacted in the previously redacted record 150. In accordance with embodiments, the analytics engines employed by the electronic computing device may be trained to detect characteristics of an object (e.g., vehicle, watch, cloth, backpack, shoe, wall, furniture, flower, flower pot, animal, blood splatter, etc.) or parts of an object (e.g., individual parts of a broken table such as table leg and table surface). The characteristics of an object include, but not limited to, object type, object shape, object pattern, text within the object, and association of an object to persons (e.g., a vehicle may be associated with a person when the vehicle is determined to have been operated and/or owned by the person) or other objects. In some embodiments, the analytics engines may include a recognition engine to recognize characteristics of persons or objects appearing in data records, where one or more of the characteristics can be used to determine an identity of a person. The characteristics may represent any data visually, audibly, or textually captured in or deduced from data records (e.g., images, videos, audios, text, etc.) that can be used to uniquely identify or verify an identity of a person. The characteristics of a person may include, but not limited to, face, fingerprint, eye (iris and retina), gesture, gait characteristic, and body marks such as birthmarks, moles, body piercings, tattoos, scars, and the like. In some embodiments, the electronic computing device 110 employs a natural language processing engine to semantically process, for example, text-based data records and detect identifiable information (e.g., person's name, address, telephone, social security number, vehicle license plate number, etc.) related to the person or object detected within the identified segment of the unredacted record 130.

At block 340, the electronic computing device 110 obtains at least one context attribute specifying a context in which the person or object (i.e., person or object redacted in the previously redacted record 150) was captured within the identified segment or segments of the unredacted record 130. The context attribute identifies one or more of: a geographical location at which the person or the object was captured in the unredacted record 130; a time at which the person or the object was captured in the unredacted record 130, an action performed by or in relation to the person or the object captured in the unredacted record 130, an interaction between the person or the object with another person or object captured in the unredacted record 130, an identity of the person or a type of the object captured in the unredacted record 130, a statement made in relation to the person or object captured in the unredacted record 130, and any other information that may describe the context in which the person or the object was captured in the unredacted record 130 corresponding to the previously redacted record 150. In accordance with some embodiments, the electronic computing device 110 may obtain the context attribute from analytics data extracted by the analytics engines from processing the identified segment within the unredacted record 130. The electronic computing device 110 may also obtain the context attribute from metadata associated with the unredacted record 130.

At block 350, the electronic computing device 110 identifies at least one other unredacted record (e.g., unredacted records 130-2, 130-3 . . . 130-N) associated with the unredacted record (e.g., unredacted record 130-1). In accordance with some embodiments, the electronic computing device 110 has permission to access all or a subset of unredacted records 130 maintained by one or more agencies at one or more records databases 120. The electronic computing device 110 searches the data records stored at the one or more records databases 120 to identify other unredacted records 130 that are associated with the unredacted record 130 which was previously redacted. In accordance with some embodiments, the electronic computing device 110 determines that the unredacted record 130 (i.e., corresponding to a previously redacted record) is associated with the at least one other unredacted record 130 when the unredacted record 130 and the at least one other unredacted record 130 are linked to one or more of: a same incident identifier, a same location, a same timestamp, or recording sources 170 assigned to a same communication group. As an example, the electronic computing device 110 may determine that the unredacted record 130-1 is associated with other unredacted records 130-2, 130-3, . . . 130-N when the unredacted record 130-1 and other unredacted records 130-2, 130-3, . . . 130-N were captured corresponding to a same incident (e.g., a vehicle collision incident). As another example, the electronic computing device 110 may determine that the unredacted record 130-1 is associated with other unredacted records 130-2, 130-3, . . . 130-N when the unredacted record 130-1 and other unredacted records 130-2, 130-3, . . . 130-N were captured during the same period of time. As another example, the electronic computing device 110 may determine that the unredacted record 130-1 is associated with other unredacted records 130-2, 130-3, . . . 130-N when the unredacted record 130-1 and other unredacted records 130-2, 130-3, . . . 130-N were captured by recording sources 170 that were deployed at the same location or when the recording sources 170 were assigned to the same communication group (e.g., a talk group). For instance, unredacted records 130-1, 130-2, and 130-3 each may represent an image or a video respectively captured by body-worn cameras operated by officers responding to the same incident and further assigned to the same communication group. In accordance with some embodiments, two unredacted records 130 may be associated with each other even when the unredacted records 130 are maintained at different records databases 120 and/or maintained by different agencies. As an example, assume that the unredacted record 130-2 (e.g., audio record) is captured by a recording source 170-2 (e.g., a land mobile radio) operated by a first agency (e.g., police department) and the unredacted record 130-N (e.g., video record) is captured by a recording source 170-N (e.g., surveillance camera) operated by a second agency (e.g., city administration). In this example, even though the unredacted records 130-2, 130-N are captured by recording sources 170-2, 170-N, respectively, associated with different agencies and further maintained at different records databases 120, the electronic computing device 110 may still determine that the unredacted records 130-2, 130-N are associated with each other, for example, when the unredacted records 130-1, 130-N are linked to a same incident (e.g., determined based on time, location, or incident identifier).

At block 360, the electronic computing device 110 determines that characteristics of a person or an object captured within at least one other segment of the at least one other unredacted record (e.g., unredacted records 130-2, 130-3 . . . 130-N) match with the characteristics of the person or the object captured within the identified segment of the unredacted record (e.g., unredacted record 130-1). In accordance with embodiments, the electronic computing device 110-1 processes each of the other unredacted records 130-2, 130-3, . . . 130-N using one or more analytics engine to extract analytics data including characteristics of one or more persons or objects captured from within one or more segments of the other unredacted records 130-2, 130-3, . . . 130-N. In accordance with embodiments, the electronic computing device 110 compares the characteristics (determined at block 330) of the person or the object detected within the identified segment of the unredacted record 130-1 with characteristics of one or more persons or objects captured within one or more segments of the other unredacted records 130-2, 130-3, . . . 130-N to determine if the same person or object (i.e., person or object redacted in the previously redacted record 150) is also captured in other unredacted records 130-2, 130-3, . . . 130-N. As an example, the electronic computing device 110 may determine that the face of a person captured in the unredacted record 130-1 (e.g., image record) and further redacted in the previously redacted record 150-1 visually matches the face of a person captured within a video of the unredacted record 130-N. As another example, the electronic computing device 110 may determine that a license plate number of a vehicle captured in an image included in the unredacted record 130-1 and further redacted in the previously redacted record 150-1 matches with a license plate number of a vehicle captured in a text record included in the unredacted record 130-N. As yet another example, assume that the electronic computing device 110 determines (at block 330) that a person captured in a video of the unredacted record 130-1 was wearing a blue shirt with a red cap. Also, assume that the electronic computing device 110 determines that the unredacted record 130-2 contains an audio communication (e.g., captured via the recording source 170-2 such as a land mobile radio) indicating that a person of interest is wearing a blue shirt with a red cap. In this example, the electronic computing device 110 may determine that the characteristics (i.e., blue shirt with a red cap) of a person captured in the unredacted record 130-1 corresponding to the previously redacted record 150-1 match with the characteristics (i.e., blue shirt with a red cap) of a person audibly captured in the unredacted record 130-2.

At block 370, the electronic computing device 110 obtains at least one other context attribute specifying a context in which the person or the object was captured within the at least other segment (determined at block 360) of the at least one other unredacted record (e.g., unredacted records 130-2, 130-3 . . . 130-N). As an example, assume that the electronic computing device 110 has determined (at block 360) that the characteristics (e.g., face, gait characteristic, body marks etc.) of a person captured within an unredacted record 130-1 (i.e., corresponding to the previously redacted record 150-1) match with one or more characteristics of a person audibly captured within a particular segment of an unredacted record 130-2 (e.g., audio record). In this case, the electronic computing device 110 determines a context attribute specifying a context in which the person or the object (with matching characteristics) was audibly captured within one or more segments of the unredacted record 130-2. The context attribute identifies one or more of: a geographical location at which the person or the object was captured in the unredacted record 130-2; a time at which the person or the object was captured in the unredacted record 130-2, an action performed by or in relation to the person or the object captured in the unredacted record 130-2, an interaction between the person or the object with another person or object captured in the unredacted record 130-2, an identity of the person or type of the object captured in the unredacted record 130-2, a statement made in relation to the person or object captured in the unredacted record 130-2, and any other information that may describe the context in which the person or the object was captured in the unredacted record 130-2. In accordance with some embodiments, the electronic computing device 110 may obtain the context attribute from analytics data extracted by the analytics engines from processing one or more segments of the unredacted record 130-2. Additionally, or alternatively, the electronic computing device 110 may also obtain the context attribute from metadata associated with the unredacted record 130-2.

At block 380, the electronic computing device 110 determines a contextual correlation value based on a correlation between the at least one context attribute (i.e., context attribute determined at block 340) and the at least one other context attribute (i.e., context attribute determined at block 370). As an example, when the context attribute represents a geographical location, the electronic computing device 110 may compare a geographical location at which a person or object (i.e., person or object redacted in a previously redacted record 150-1) was captured in an unredacted record 130-1 with a geographical location at which a person or object with matching characteristics was captured in another unredacted record 130-N. When the geographical locations match or are within a predefined distance, the electronic computing device 110 may assign a contextual correlation value representing a correlation between the two context attributes. The contextual correlation value may be expressed in terms of percentages, correlation levels, numerical values, among other possibilities. In this example, the electronic computing device 110 may assign a contextual correlation value of '100%' when the geographical location associated with the redacted person or object captured in the unredacted record 130-1 matches with the geographical location associated with the person captured in the other unredacted record 130-N. In one embodiment, the electronic computing device 110 may assign a contextual correlation value based on the correlation between a plurality of context attributes (i.e., multiple context attributes obtained at block 340 corresponding to the redacted person or object captured within the unredacted record 130-1) and a corresponding plurality of context attributes (i.e., multiple context attributes obtained at block 370 corresponding to the person or object captured within the unredacted record 130-N). As an example, suppose the electronic computing device 110 computes a contextual correlation value based on a correlation between context attributes including a first context attribute indicating a geographical location at which a person was captured, a second context attribute indicating a time at which the person was captured, and a third context attribute indicating an interaction (or non-interaction) between the person with another person or another object such as a vehicle. In this case, the electronic computing device 110 may correlate the geographical locations at which the same person was respectively captured in the unredacted records 130-1, 130-N to compute a first contextual correlation value. The electronic computing device 110 may further correlate the time at which the same person was respectively captured in the unredacted records 130-1, 130-N to compute a second contextual correlation value. The electronic computing device 110 may further determine whether the unredacted records 130-1, 130-N have both captured the same person interacting with the same object to compute a third contextual correlation value. The electronic computing device 110 then determines an aggregated contextual correlation value as a function (e.g., sum function, average function, etc.) of the first, second, and third contextual correlation values. In one embodiment, the electronic computing device 110 may apply different weights to correlation values resulting from correlations between different types of context attributes. As an example, the electronic computing device 110 may apply a higher weight to a context attribute indicating a person's interaction with another person or object, but lower weight to context attributes indicating the geographical location and time. In accordance with some embodiments, if there are multiple persons or objects that were redacted in the identified segment of the previously redacted record 150 (e.g., redacted record 150-1), the electronic computing device 110 determines a separate contextual correlation value corresponding to each different redacted person or object.

At block 390, after determining the contextual correlation value, the electronic computing device 110 determines whether the contextual correlation value exceeds a correlation threshold. In accordance with embodiments, the electronic computing device 110 is configured to compare the contextual correlation value determined at block 380 with the correlation threshold. The correlation threshold may be set in terms of percentages (e.g., 80%, 90%, etc.), numerical values (e.g., 8, 9 etc.), correlation levels (e.g., level 8, level 9), among other possibilities. The electronic computing device 110 may set and/or dynamically adjust the correlation threshold based on one or more of user inputs or system inputs obtained through machine learning algorithms. When the contextual correlation value (e.g., 100%) exceeds the threshold (e.g., 90%), the electronic computing device 110 generates at least one other redacted record (e.g., redacted record 150-2) by redacting the person or the object detected within the at least one other unredacted record (e.g., unredacted record 130-2). Otherwise, when the contextual correlation value does not exceed the threshold, the electronic computing device 110 does not redact the person or the object detected within the at least one other unredacted record (e.g., unredacted record 130-2). In accordance with some embodiments, if there are multiple persons or objects that were redacted in the identified segment of the previously redacted record 150 (e.g., redacted record 150-1), the electronic computing device 110 compares a contextual correlation value determined for each different person or object with the correlation threshold and further redacts each person or object from the at least one other unredacted record (e.g., unredacted record 130-2) when the contextual correlation exceeds the correlation threshold. If the contextual correlation value determined for any of the persons or objects does not exceed the threshold, then the electronic computing device 110 refrains from redacting the particular one of the persons or objects captured in the at least one other unredacted record (e.g., unredacted record 130-2). In any case, the electronic computing device 110 generates a redacted record (e.g., redacted record 150-2) as long as at least one person or object was redacted from the unredacted record (e.g., unredacted record 130-2). In addition, the electronic computing device 110 also generates a redaction metadata (e.g., redaction metadata 160-2) identifying the specific segments in which one or more persons or objects were redacted from the unredacted record 130 (e.g., unredacted record 130-2). The redaction metadata 160-2 may also identify a rule, policy, or a reason under which the specific segments within the unredacted record 130-2 have been redacted to generate the redaction record 150-2. In one embodiment, the redaction metadata 160-2 may include an indicator indicating that the redaction record 150-2 was generated based on a contextual correlation with a previously redacted record 150-1. In this case, the redaction metadata 160-2 may include a link to the previously redacted record 150-1 or the corresponding unredacted record 130-1.

In accordance with some embodiments, when the contextual correlation value exceeds the correlation threshold, the electronic computing device 110 redacts at least one other unredacted record (e.g., unredacted records 130-2, 130-3 . . . 130-N) only after obtaining permission from an authorized user. In this embodiment, the electronic computing device 110 transmits, to a communication device of an authorized user (e.g., a user affiliated with an agency that maintains the other unredacted record), a request for approval to redact the person or the object detected within the at least one other segment of the at least one other unredacted record. The electronic computing device 110 then redacts the person or the object detected within the at least one other segment of the at least one other unredacted record only when a response indicating an approval to redact the person or the object is received from the communication device of the authorized user.

In accordance with some embodiments, the electronic computing device 110 may determine that a first person or object captured within the identified segment of the unredacted record 130-1 (i.e., corresponding to the previously redacted record 150-1) is related to a second person or object captured within the same identified segment or different segment of the unredacted record 130-1. In accordance with some embodiments, the electronic computing device 110 may determine that the first person or object is related to the second person or object based on analytics data extracted from analyzing the unredacted record 130-1 using one or more analytics engines. In these embodiments, the electronic computing device 110 may determine that the first person or object captured in the unredacted record 130-1 is related to the second person or object captured in the unredacted record 130-1 when it is determined that the first person or object captured in the unredacted record 130-1 has interacted with the second person or object captured in the unredacted record 130-1. As an example, the electronic computing device 110 may determine that the first person captured in the unredacted record 130-1 has interacted with the second person captured in the unredacted record 130-1 based on physical proximity or detected conversations between the two persons. As another example, the electronic computing device 110 may determine that a person captured in the unredacted record 130-1 has interacted with an object captured in the unredacted record 130-1 based on physical proximity between the person and the object, or one or more actions performed by the person in relation to the object (e.g., a person exiting, entering, or operating a vehicle). As another example, the electronic computing device 110 may determine that a first person or object captured in the unredacted record 130-1 is related to the second person or object captured in the unredacted record 130-1 when the electronic computing device 110 detects a statement or a display (e.g., gesture) from the second person or object revealing an identity of the person or object captured in the unredacted record 130-1. As another example, assume that a first person redacted from a previously redacted record 150-1 is also captured in an unredacted record 130-N. Further assume that the first person captured in the unredacted record 130-N is having conversations with a second person captured in the unredacted record 130-N. In this example, the electronic computing device 110 may redact the conversations between the two persons as captured in the unredacted record 130-N to generate a redacted record 150-N when the conversations include any statement (e.g., from the second person) revealing the identity (i.e., personal identifiable information) of the person redacted from the previously redacted record 150-1. In addition, the electronic computing device 110 may also redact, for example, the face of the first person as well as the second person captured in the unredacted record 130-N while generating a corresponding redacted record 150-N. In this example, the electronic computing device 110 may determine characteristics (e.g., similar to block 330) of the second person captured in the unredacted record 130-N. The electronic computing device 110 may further determine (e.g., similar to block 360) that characteristics of the first person captured in the unredacted record 130-1 match with the characteristics of the second person captured in the unredacted record 130-N. The electronic computing device 110 then redacts the second person in addition to the first person from the unredacted record 130-N to generate a corresponding redacted record 150-N. In some embodiments, the electronic computing device 110 may also redact identifiable information (e.g., person's face, name, phone number, vehicle license plate number etc.) related to the second person from one or more previously redacted records 150 (e.g., redacted record 150-1) even if the electronic computing device 110 determines that the one or more previously redacted records 150 did not capture any interaction between the first person and the second person.

In accordance with embodiments, the electronic computing device 110 may execute the process 300 to redact a particular unredacted record, for example, unredacted record 130-2 in response to a user input requesting access to view and/or playback the unredacted record 130-2. In these embodiments, in response to a user input requesting to access an unredacted record 130-2, the electronic computing device 110 determines, in accordance with the block 350 of the process 300 shown in FIG. 3, that an unredacted record 130-2 is associated with another unredacted record, for example, unredacted record 130-1 which has been previously redacted to generate a corresponding redacted record 150-1 in accordance with the block 350. The electronic computing device 110-1 then retrieves redaction metadata 160-1 associated with the redacted record 150-1. In accordance with some embodiments, a single unredacted record 130-1 may be redacted to generate multiple versions of the redacted record 150-1, where each version can be accessed by users (e.g., press, police, medical, etc.) with different levels of authorization. Accordingly, in these embodiments, multiple versions of redaction metadata 160 may be maintained for multiple versions of the redacted record 150-1. In any case, in response to user input requesting to access the unredacted record 130-2, the electronic computing device 110 identifies an associated unredacted record 130-1 and further retrieves a version of redaction metadata 160-1 that corresponds to a version of the redacted record 150-1 that is accessible by the user requesting to access the unredacted record 130-2. The electronic computing device 110 then executes the remaining blocks of process 300 set forth in FIG. 3 to generate a redacted record 150-2 corresponding to the unredacted record 130-2 based on redaction 140-1 applied to the unredacted record 130-1. The redacted record 150-2 can then be accessed and/or played back to the user in real-time in response to the user input received from the user. In some of these embodiments, the electronic computing device 110 may not store a copy of the redacted record 150-2 at the records database 120. In another embodiment, the electronic computing device 110 may delete any copy of the redacted record 150-2 locally and/or remotely stored, for example, at the records database 120, after the user has viewed and/or played back the redacted record 150-2.

Figure 4:
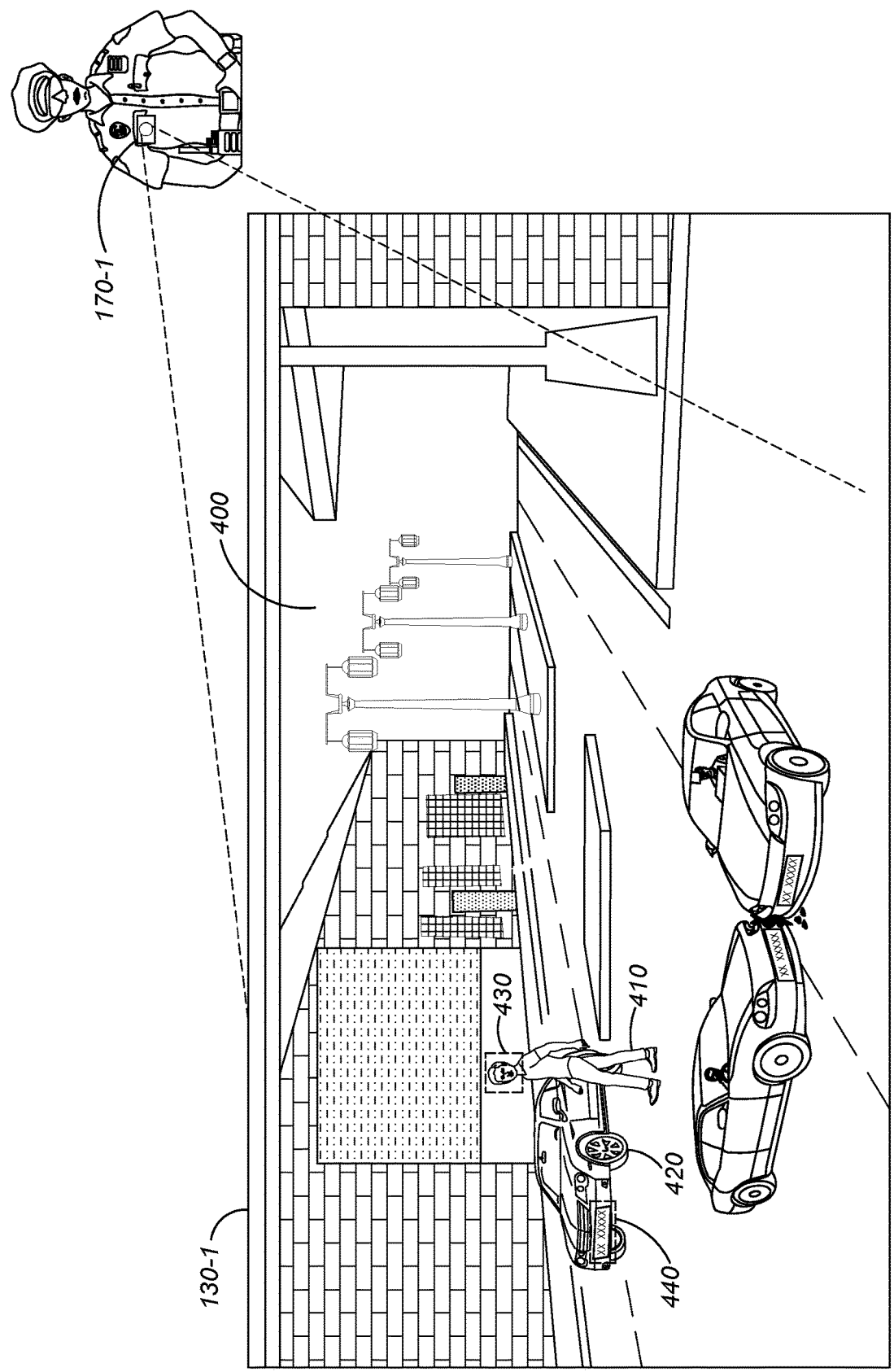
FIG. 4 shows an example of an unredacted record including an image captured from an incident scene by a first recording source in accordance with some embodiments.

FIG. 4 shows an example of an unredacted record 130-1 including an image 400 captured corresponding to an incident (e.g., a vehicle collision incident) by a recording source 170-1 such as a body-worn camera in accordance with some embodiments. Assume that an operator authorized by a public-safety agency (e.g., police) to redact records views the image 400 included in the unredacted record 130-1 and decides to redact the face of a person 410 (e.g., a bystander with no evidentiary value) as well as the license plate number of a vehicle 420 (e.g., a vehicle determined to have been operated by the person 410) appearing within the image 400. In this case, the operator may provide an input selecting one or more portions (e.g., a segment 430 in which the face of the person 410 appears and a segment 440 in which the license plate number of the vehicle 420 appears) of the image 400 on which redaction 140-1 (e.g., blurring) is to be applied. Alternatively, the operator can also provide an input selecting one or more segments (e.g., other than the segments 430, 440) within the image that are to remain unredacted. The electronic computing device 110 may automatically determine that segments 430, 440 are to be redacted based on the input. In any case, in response to the input received from the operator, the electronic computing device 110 shown in FIGS. 1 and 2 or some other computing device employed by the public-safety agency may automatically redact the data contained in the segments 430, 440 selected by the operator. As a result of redaction 140-1 applied to the unredacted record 130-1, a redacted record 150-1 is generated as shown in FIG. 5.

Figure 5:
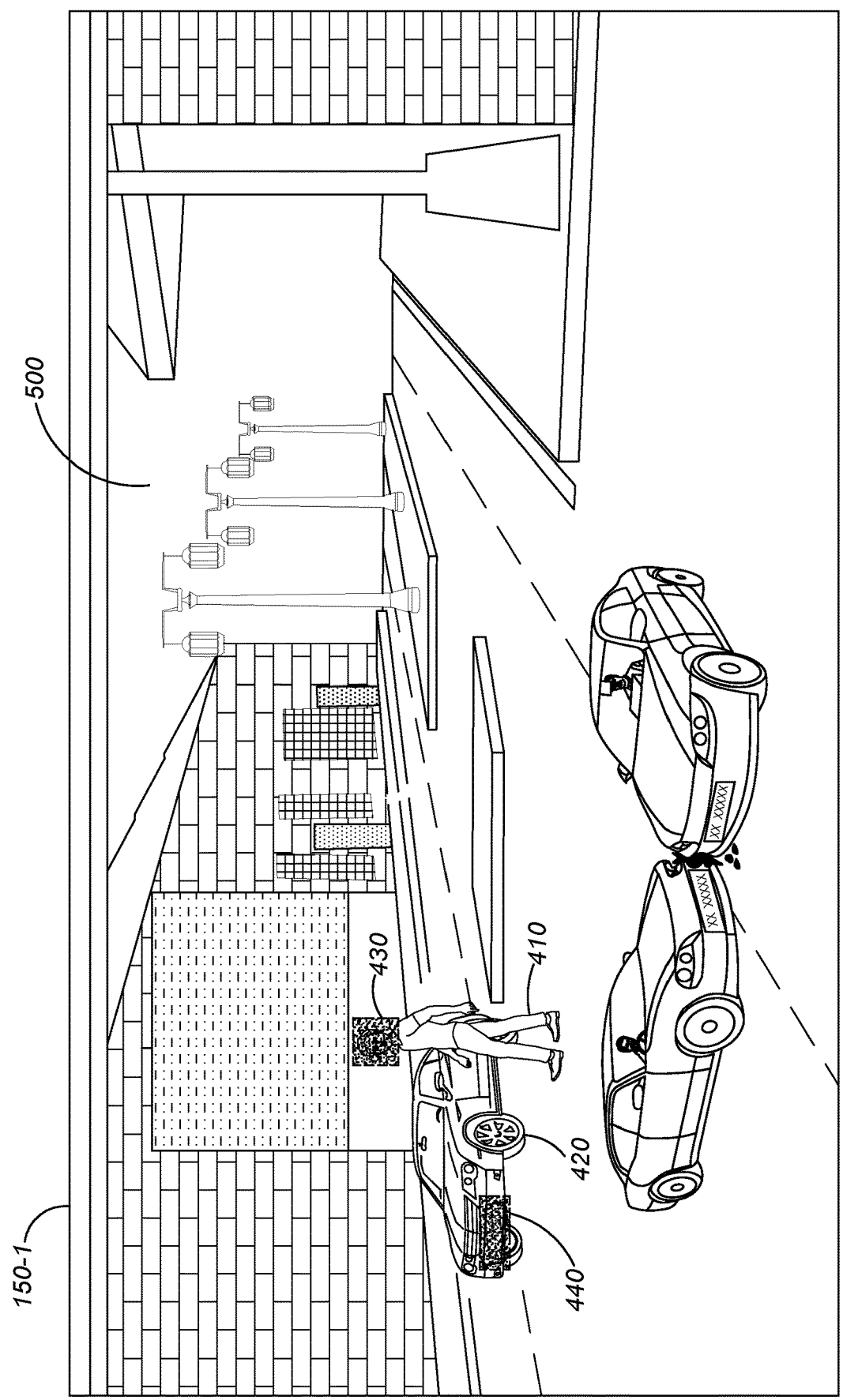
FIG. 5 shows an example of a redacted record generated based on redaction applied to the image included in the unredacted record shown in FIG. 4 in accordance with some embodiments.

Now referring to FIG. 5, a redacted record 150-1 is shown with an image 500 in which the segment 430 is redacted to mask the face of the person 410 and the segment 440 is redacted to mask the license plate number of the vehicle 420. In accordance with embodiments, a redaction metadata 160-1 (see FIG. 1) is automatically generated to identify the segments 430, 440 within the image 400 included in the unredacted record 130-1 to which redaction 140-1 was applied to generate the redacted record 150-1. In accordance with some embodiments, whenever an unredacted record (e.g., unredacted record 130-1) has been redacted to generate a new redacted record (e.g., redacted record 150-1), the electronic computing device 110 automatically executes the process set forth in FIG. 3 to redact other unredacted records that are contextually-related to a previously redacted record (e.g., redacted record 150-1) as further described below with reference to FIGS. 6-9.

Figure 6:
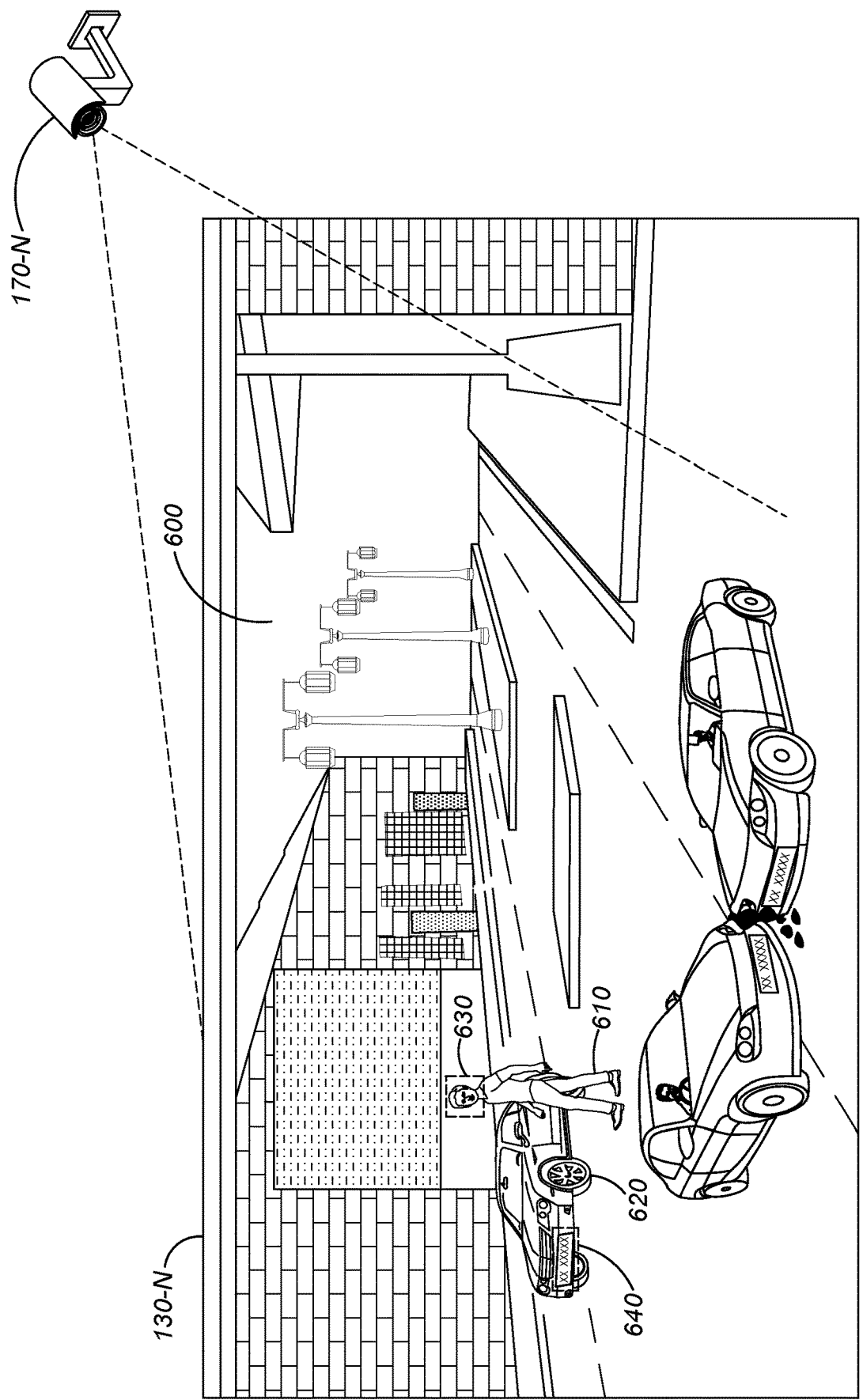
FIG. 6 shows an example of an unredacted record including an image captured from the same incident scene shown in FIG. 4 by a second recording source in accordance with some embodiments.
Figure 7:
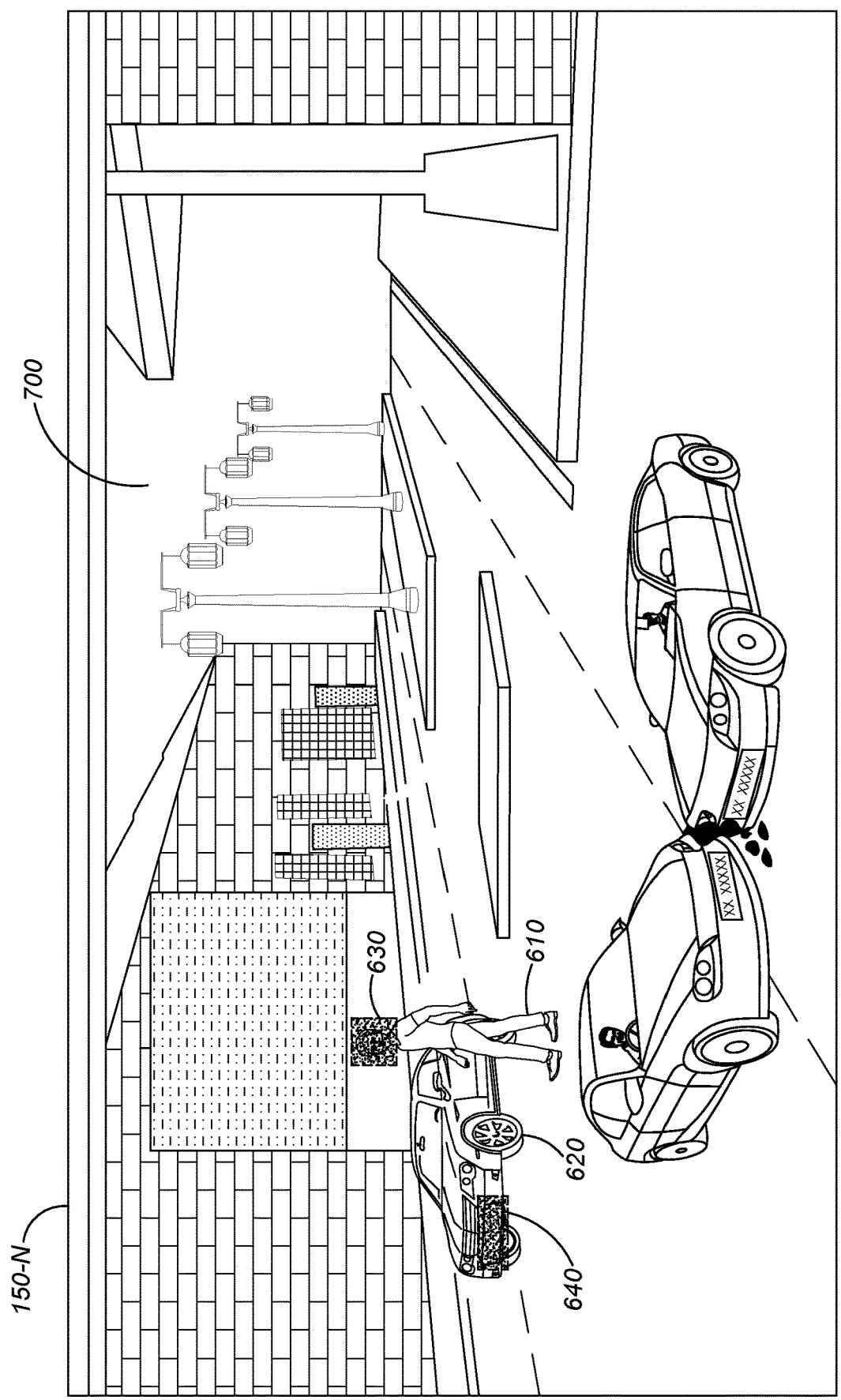
FIG. 7 shows an example of a redacted record generated based on redaction applied to the image included in the unredacted record shown in FIG. 6 in accordance with some embodiments.

FIG. 6 shows an example of an unredacted record 130-N including an image 600 captured corresponding to the same incident shown in FIG. 4 by a recording source 170-N such as a surveillance camera in accordance with some embodiments. In this example, the electronic computing device 110 may identify that the unredacted record 130-N is associated with an unredacted record 130-1 (which has been previously redacted to generate a redacted record 150-1 as shown in FIG. 5) because both the unredacted records 130-1, 130-N were captured corresponding to the same incident. In the example shown in FIG. 6, the electronic computing device 110 may determine that a person 610 captured within a segment 630 of the image 600 included in the unredacted record 130-N has characteristics (e.g., face) matching the characteristics of the person 410 captured within the segment 430 (identified in redaction metadata 160-1) of the image 400 included in the unredacted record 130-1 shown in FIG. 4. The electronic computing device 110 may further determine that a vehicle 620 captured within a segment 640 of the image 600 included in the unredacted record 130-N has characteristics (e.g., license plate number) matching the characteristics of the vehicle 420 captured within the segment 440 (identified in redaction metadata 160-1) of the image 400 included in the unredacted record 130-1 shown in FIG. 4. The electronic computing device 110 may further determine a contextual correlation value based on a correlation between a context attribute specifying a context (e.g., geographical location, time, person's action or behavior level, person's interaction with other persons or objects) in which the person 410 captured in the image 400 included in the unredacted record 130-1 was redacted and a context attribute specifying a context in which the person 610 was captured in the image 600 included in the unredacted record 130-N. When the contextual correlation value exceeds a correlation threshold, the electronic computing device 110 automatically applies redaction 140-N (which may be of similar type to redaction 140-1 previously applied to the unredacted record 130-1 to generate the redacted record 150-1) to the segment 630 of the image 600 included in the unredacted record 130-N to generate a redacted record 150-N as shown in FIG. 7. The electronic computing device 110 may similarly determine a contextual correlation value based on a correlation between a context attribute specifying a context (e.g., geographical location, time, action performed in relation to the object, interaction of the object by another person or object) in which the vehicle 420 captured in the image 400 included in the unredacted record 130-1 was redacted and a context attribute specifying a context in which the vehicle 620 was captured in the image 600 included in the unredacted record 130-N. When the contextual correlation value exceeds a correlation threshold, the electronic computing device 110 automatically applies redaction 140-N (which may be of similar type to redaction 140-1 previously applied to the unredacted record 130-1 to generate the redacted record 150-1) to the segment 640 of the image 600 included in the unredacted record 130-N to generate a redacted record 150-N as shown in FIG. 7.

In the example shown in FIG. 7, a redacted record 150-N is generated with an image 700 in which the segment 630 is redacted to mask the face of the person 610 and the segment 640 is redacted to mask the license plate number of the vehicle 620. In accordance with embodiments, a redaction metadata 160-N (see FIG. 1) is automatically generated to identify the segments 630, 640 within the image 600 included in the unredacted record 130-N to which redaction 140-N was applied to generate the redacted record 150-N. In accordance with embodiments, the electronic computing device 110 repeats the execution of the process set forth in FIG. 3 to redact any unredacted record (irrespective of data type or recording sources 170) that is contextually-related to a previously redacted record 150-1.

Figure 8:
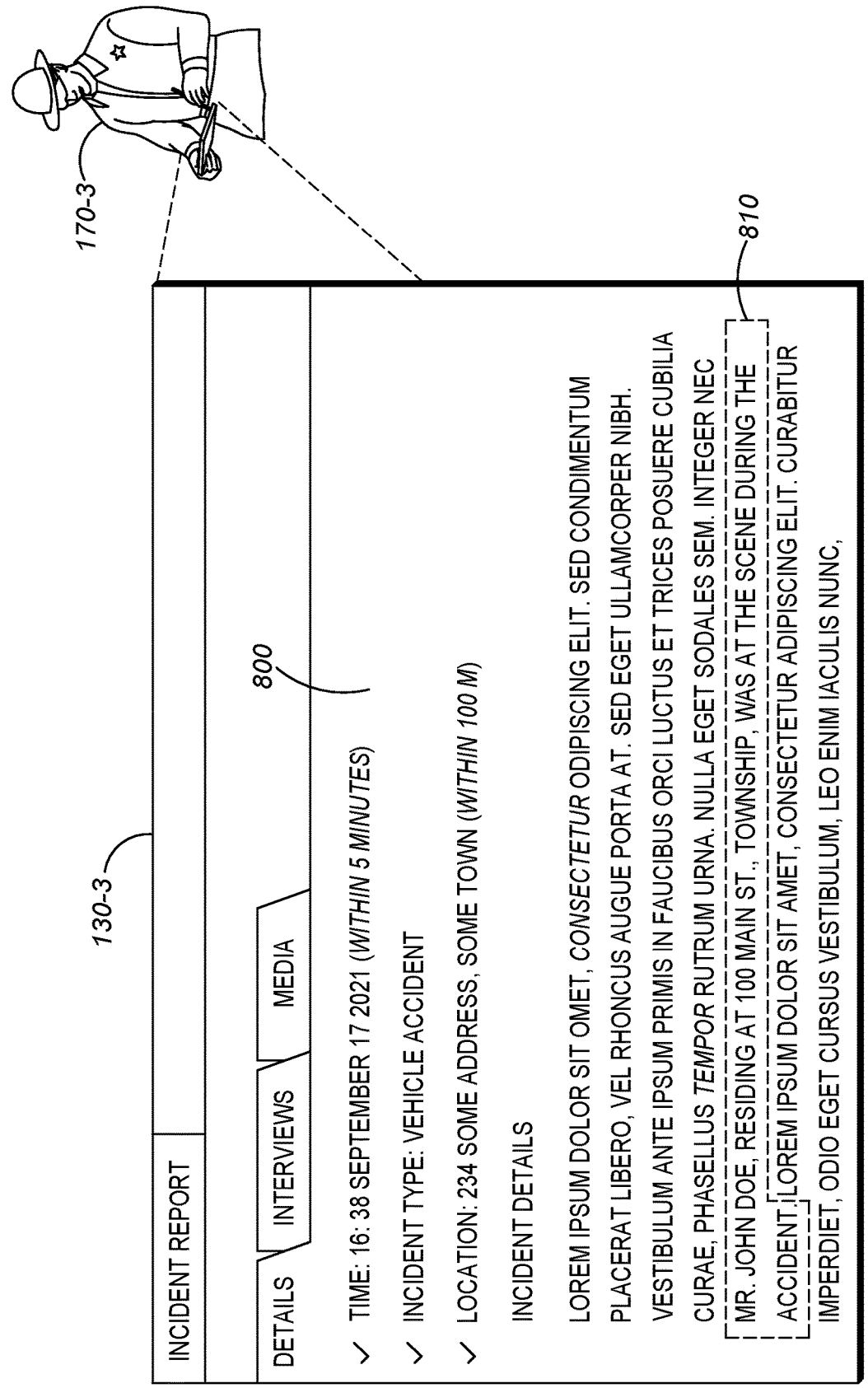
FIG. 8 shows an example of an unredacted record including an incident report captured in relation to the same incident scene shown in FIGS. 4 and 6 by a third recording source in accordance with some embodiments.

FIG. 8 shows an example of an unredacted record 130-3 including a text-based incident report 800 captured from the same incident shown in FIGS. 4 and 6 by a recording source 170-3 such as a communication device operated by a public-safety officer. As an example, the public-safety officer might have submitted the incident report 800 after responding to a vehicle collision incident at a location of the incident scene. In this example, the electronic computing device 110 may identify that the unredacted record 130-3 is associated with an unredacted record 130-1 (which has been previously redacted to generate a redacted record 150-1 shown in FIG. 5) because both the unredacted records 130-1, 130-3 were captured corresponding to the same incident. In the example shown in FIG. 8, the electronic computing device 110 may determine that information (e.g., name, address etc.) captured within a segment 810 of the incident report included in the unredacted record 130-3 is associated with the person 410 captured within the segment 430 (identified in redaction metadata 160-1) of the image 400 included in the unredacted record 130-1. As an example, the electronic computing device 110 may process the incident report 800 using a natural language processing engine to extract personal identifiable information such as name and address of a person. The electronic computing device 110 then verifies whether the characteristics (i.e., identifiable information) captured in textual form in the incident report 800 included in the unredacted record 130-3 match with characteristics (e.g., identifiable information retrieved from data records other than the unredacted record 130-1) of the person 410 captured within the image 400 of the unredacted record 130-1. If there is a match in the characteristics, the electronic computing device 110 further determines a contextual correlation value based on a correlation between a context attribute specifying a context (e.g., geographical location, time, person's action or behavior level, person's interaction with other person's or objects) in which the person 410 captured within the image 400 included in the unredacted record 130-1 was redacted and a context attribute specifying a context in which the same person's personal identifiable information was captured in the unredacted record 130-3. When the contextual correlation value exceeds a correlation threshold, the electronic computing device 110 automatically applies redaction 140-3 (e.g., masking the text to indicate that the text has been redacted) to the segment 810 of the incident report 800 included in the unredacted record 130-3 to generate a redacted record 150-3 as shown in FIG. 9.

In the example shown in FIG. 9, a redacted record 150-3 is generated with a redacted incident report 900 in which the segment 810 is redacted to mask the person's personal identifiable information. In accordance with embodiments, a redaction metadata 160-3 (see FIG. 1) is automatically generated to identify the segment 810 within the incident report 800 included in the unredacted record 130-3 to which redaction 140-3 was applied to generate the redacted record 150-3. In accordance with embodiments, in the examples shown in FIGS. 7, and 9, the electronic computing device 110 may redact the unredacted records 130-N, 130-3 to generate the corresponding redacted records 150-N, 150-3 only after receiving an approval from an authorized user. In one embodiment, the electronic computing device 110 may automatically delete an unredacted record 130 or mark an unredacted record 130 for deletion whenever an unredacted record 130 has been redacted to generate a corresponding redacted record 150.

In accordance with some embodiments, the electronic computing device 110 may execute a process to unredact a person (or object) previously redacted in one or more redacted records 150 in response to a request from an authorized user. As an example, assume that the electronic computing device 110 has automatically redacted information (i.e., person's 610 face within the image 700 shown in FIG. 7 and person's 610 name and address included within the incident report 900 shown in FIG. 9) relating to the person 610 to generate redacted records 150-3, 150-N based on a redaction of the face of the person 610 in a previously redacted record 150-1. In this example, assume that the electronic computing device 110 has received an authorized request (e.g., in response to a court order authorizing unredaction of data) to unredact identifiable information related to the same person 610. In response to this request, the electronic computing device 110 automatically processes the previously redacted records (e.g., redacted records 150-1, 150-2, 150-3, 150-N) to unredact identifiable information (e.g., person's 610 face shown within the images 600, 700 and person's 610 name and address included within the incident report 900) related to the person 610.

While embodiments of the present disclosure are described with examples relating to images captured corresponding to public-safety related incident scenes, embodiments of the present disclosure can be also readily adapted for non-public safety environments including press, media, utilities, retail, healthcare, manufacturing, oil/gas, electric, private security, and other business environments where there may be a need to automatically redact different types of data records captured in such environments based on a contextual correlation with one or more previously redacted records.

As should be apparent from this detailed description, the operations and functions of the computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of redacting records based on a contextual correlation with a previously redacted record, the method comprising:
    obtaining, at an electronic computing device, redaction metadata associated with a previously redacted record, the redaction metadata identifying a segment within an unredacted record to which redaction was applied to generate the previously redacted record;
    accessing, at the electronic computing device, from a records database, the unredacted record identified by the redaction metadata, the unredacted record including data in an unredacted form and further stored as a record that is separate from the previously redacted record;
    processing, at the electronic computing device, the identified segment of the unredacted record to detect that a person or an object captured in an unredacted form within the identified segment of the unredacted record was redacted in the previously redacted record;
    processing, at the electronic computing device, the identified segment of the unredacted record to detect characteristics of the person or the object;
    obtaining, at the electronic computing device, at least one context attribute specifying a context in which the person or the object was captured in the unredacted form within the identified segment of the unredacted record;
    identifying, at the electronic computing device, at least one other unredacted record that is associated with the unredacted record identified by the redaction metadata;
    determining, at the electronic computing device, that characteristics of a person or an object captured in an unredacted form within at least one other segment of the at least one other unredacted record match with the characteristics of the person or the object captured in the unredacted form within the identified segment of the unredacted record;
    obtaining, at the electronic computing device, at least one other context attribute specifying a context in which the person or the object was captured within the at least one other segment of the at least one other unredacted record;
    determining, at the electronic computing device, a contextual correlation value based on a correlation between the at least one context attribute and the at least one other context attribute; and
    when the contextual correlation value exceeds a correlation threshold, generating at least one other redacted record from the at least one other unredacted record by redacting the person or the object captured within the at least one other segment of the at least one other unredacted record.

2. The method of claim 1, wherein the unredacted record is of a first record type and the at least one other unredacted record is of a second record type different from the first record type.

3. The method of claim 2, wherein the first and second record types indicate one of audio record, video record, image record, or text record.

4. The method of claim 1, wherein processing comprises:
processing, at the electronic computing device, the identified segment of the unredacted record using an analytics engine.

5. The method of claim 1, wherein the context attribute identifies one or more of: a geographical location at which the person or the object was captured in the unredacted record; a time at which the person or the object was captured in the unredacted record, an action performed by or in relation to the person or the object captured in the unredacted record, an interaction between the person or the object with another person or object captured in the unredacted record, an identity of the person or type of the object captured in the unredacted record, and a statement made in relation to the person or the object captured in the unredacted record.

6. The method of claim 1, wherein identifying comprises:
determining that the unredacted record is associated with the at least one other unredacted record when the unredacted record and the at least one other unredacted record are linked to one or more of: a same incident identifier, a same location, a same timestamp, or recording sources assigned to a same communication group.

7. The method of claim 1, wherein the unredacted record is captured by a recording source assigned to a first agency and the at least one other unredacted record is captured by a recording source assigned to a second agency.

8. The method of claim 1, further comprising:
transmitting, at the electronic computing device, to a communication device of an authorized user, a request for approval to redact the person or the object captured within the at least one other segment of the at least one other unredacted record,
wherein redacting the person or the object captured within the at least one other segment of the at least one other unredacted record to generate the at least one other redacted record only when a response indicating an approval to redact the person or the object is received from the communication device of the authorized user.

9. The method of claim 1, further comprising:
determining, at the electronic computing device, that the person or the object captured in the unredacted record is related to at least one other person or object captured in the unredacted video;
determining, at the electronic computing device, characteristics of the at least one other person or object captured in the unredacted record; and
determining, at the electronic computing device, that the characteristics of the at least one other person or object captured in the unredacted record match with characteristics of at least one other person or object captured in the at least one other unredacted record;
wherein generating the at least one other redacted record comprises further redacting the at least one other person or object detected in the at least one other unredacted record.

10. The method of claim 9, wherein determining that the person or object captured in the unredacted video is related to the at least one other person captured in the unredacted record comprises determining that the person or the object captured in the unredacted record has interacted with the at least one other person or object captured in the unredacted record.

11. The method of claim 9, wherein determining that the person or object captured in the unredacted record is related to the at least one other person or object captured in the unredacted record comprises detecting a statement or display from the at least one other person or object revealing an identity of the person or the object captured in the unredacted record.

12. An electronic computing device, comprising:
a communications interface; and
an electronic processor communicatively coupled to the communications interface, the electronic processor is configured to:
obtain redaction metadata associated with a previously redacted record, the redaction metadata identifying a segment within an unredacted record to which redaction was applied to generate the previously redacted record;
access, from a records database, the unredacted record identified by the redaction metadata, the unredacted record including data in an unredacted form and further stored as a record that is separate from the previously redacted record;
process the identified segment of the unredacted record to detect that a person or an object captured in an unredacted form within the identified segment of the unredacted record was redacted in the redacted record;
process the identified segment of the unredacted record to detect characteristics of the person or the object;
obtain at least one context attribute specifying a context in which the person or the object was captured within the identified segment of the unredacted record;
identify at least one other unredacted record that is associated with the unredacted record identified by the redaction metadata;
determine that characteristics of a person or an object captured in an unredacted form within at least one other segment of the at least one other unredacted record match with the characteristics of the person or the object captured in the unredacted from within the identified segment of the unredacted record;
obtain at least one other context attribute specifying a context in which the person or the object was captured within the at least one other segment of the at least one other unredacted record;
determine a contextual correlation value based on a correlation between the at least one context attribute and the at least one other context attribute; and
generate at least one other redacted record from the at least one other unredacted record by redacting the person or the object captured within the at least one other segment of the at least one other unredacted record when the contextual correlation value exceeds a correlation threshold.

13. The electronic computing device of claim 12, wherein the unredacted record is of a first record type and the at least one other unredacted record is of a second record type different from the first record type.

14. The electronic computing device of claim 13, wherein the first and second record types indicate one of audio record, video record, image record, or text record.

15. The electronic computing device of claim 12, wherein the electronic processor is configured to:
process the identified segment of the unredacted record using an analytics engine.

16. The electronic computing device of claim 12, wherein the context attribute identifies one or more of: a geographical location at which the person or the object was captured in the unredacted record; a time at which the person or the object was captured in the unredacted record, an action performed by or in relation to the person or the object captured in the unredacted record, an interaction between the person or the object with another person or object captured in the unredacted record, an identity of the person or type of the object captured in the unredacted record, and a statement made in relation to the person or the object captured in the unredacted record.

17. The electronic computing device of claim 12, wherein the electronic processor is configured to:

determine that the unredacted record is associated with the at least one other unredacted record when the unredacted record and the at least one other unredacted record are linked to one or more of: a same incident identifier, a same location, a same timestamp, or recording sources assigned to a same communication group.

18. The electronic computing device of claim 12, wherein the unredacted record is captured by a recording source assigned to a first agency and the at least one other unredacted record is captured by a recording source assigned to a second agency.

19. The electronic computing device of claim 12, wherein the electronic processor is configured to:

transmit, via the communications interface, to a communication device of an authorized user, a request for approval to redact the person or the object captured within the at least one other segment of the at least one other unredacted record; and redact the person or the object captured within the at least one other segment of the at least one other unredacted record to generate the at least one other redacted record only when a response indicating an approval to redact the person or the object is received from the communication device of the authorized user.

20. The electronic computing device of claim 12, wherein the electronic processor is configured to:

determine that the person or the object captured in the unredacted record is related to at least one other person or object captured in the unredacted video, determine characteristics of the at least one other person or object captured in the unredacted record;

determine that the characteristics of the at least one other person or object captured in the unredacted record match with characteristics of at least one other person or object captured in the at least one other unredacted record; and generate the at least one other redacted record by further redacting the at least one other person or object detected in the at least one other unredacted record.

* * * * *